Figure 1:
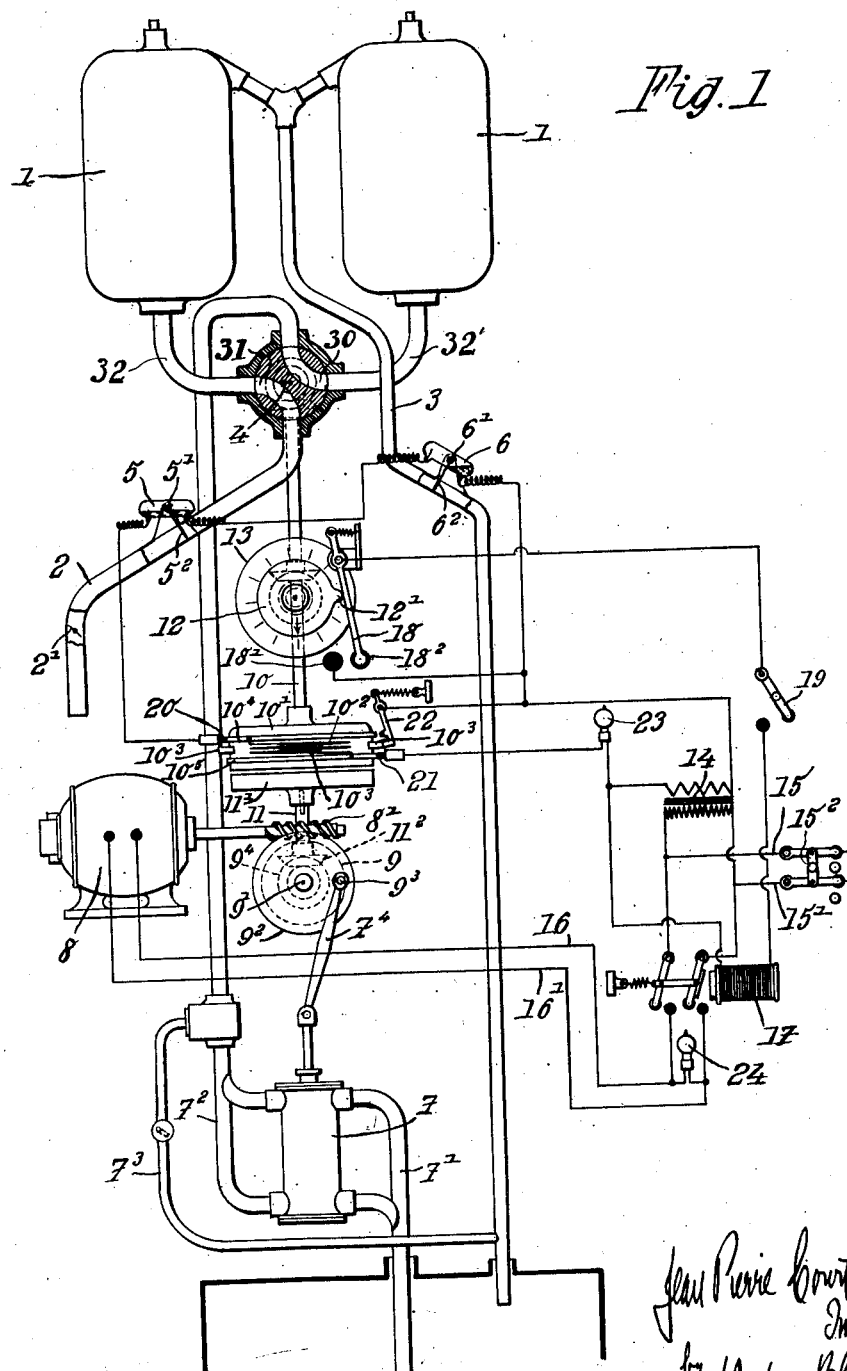

Jan. 22, 1929.  J. P. COURTIOUX  1,699,562
MEASURING AND DELIVERING APPARATUS FOR LIQUIDS
Filed July 8, 1924   3 Sheets-Sheet 1

Jan. 22, 1929.  1,699,562
J. P. COURTIOUX
MEASURING AND DELIVERING APPARATUS FOR LIQUIDS
Filed July 8, 1924   3 Sheets-Sheet 2

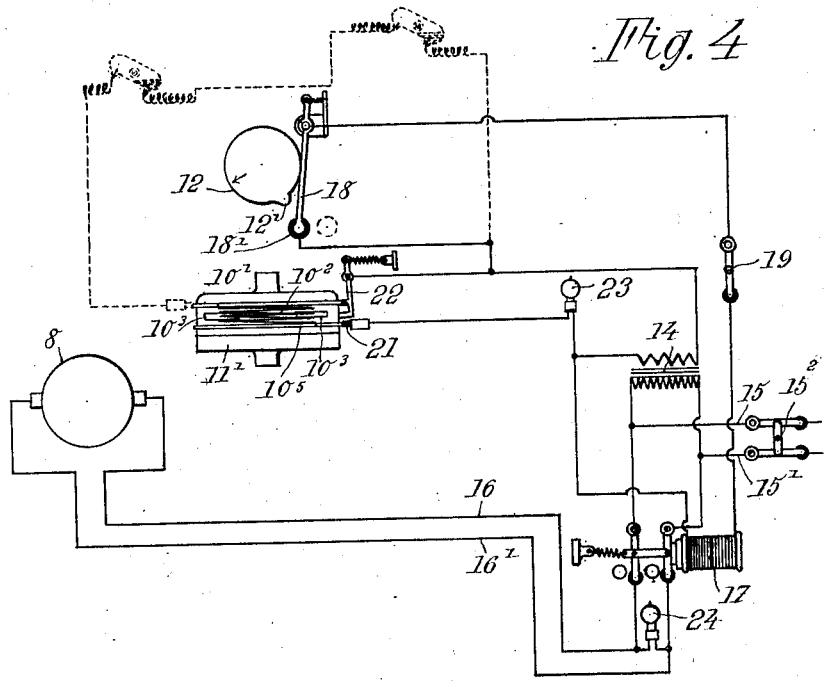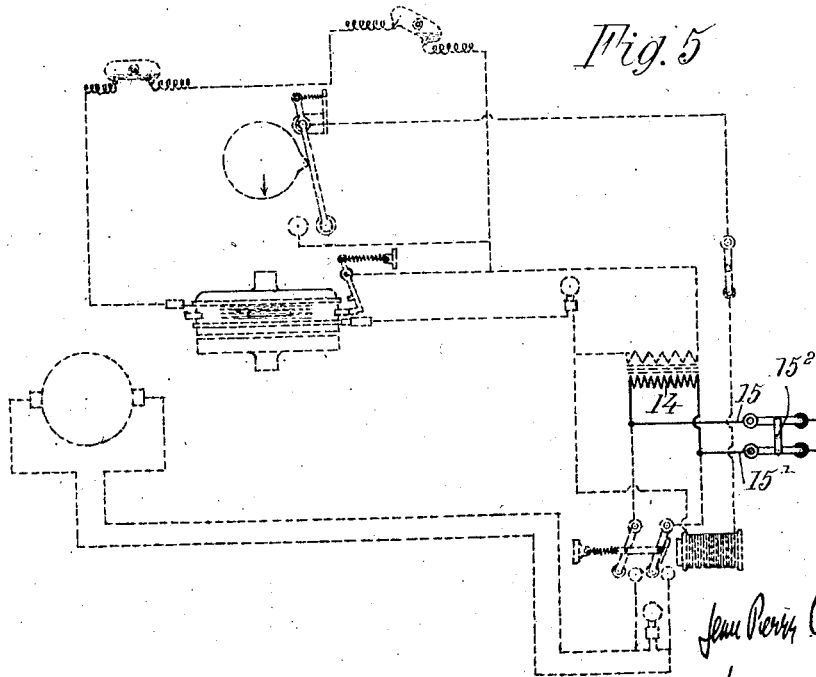

Patented Jan. 22, 1929.

1,699,562

UNITED STATES PATENT OFFICE.

JEAN PIERRE COURTIOUX, OF PARIS, FRANCE.

MEASURING AND DELIVERING APPARATUS FOR LIQUIDS.

Application filed July 8, 1924, Serial No. 724,758, and in Belgium June 10, 1924.

This invention relates to measuring and delivering apparatus for liquids, and refers more particularly although not exclusively to apparatus of the kind in question for combustible liquids such as petrol, benzine and the like, as the use of this apparatus in dispensing combustible liquids is highly advantageous.

A primary object of the invention is so to construct such apparatus that automatic operation thereof is obtained by simple and accurate means, independent of the rate at which the liquid is delivered or dispensed. Hence, the liquid can be measured and delivered with a precision which has hitherto not been possible.

In prior devices of this class, it has been customary to operate in various ways. In certain types of apparatus, the filling operation has been accomplished by a pump operated by any appropriate means, and measuring chambers have been brought alternately into position for filling and emptying by means of parts operated by hand, thus necessitating the continual presence of a person for actuating the reversing means, that is, the means for reversing the direction of the flow of the liquid through the measuring chamber or chambers.

Other types of apparatus have been operated automatically, at least in theory, and have comprised reversing means controlled in any suitable manner, coming into operation when one of the measuring chambers is full. The reversing means then causes the emptying of the chamber which had been filled. This construction possesses the disadvantage that as the reversing means comes into operation when one of the measuring chambers is full, the latter immediately commences to empty whether the other measuring chamber is completely empty or not with resulting inaccuracy in the quantity of the liquid delivered. In apparatus of this kind the pumping operation being by hand, has to be effected at a speed corresponding to the time taken in emptying the measuring chambers, and this varies according to the operating conditions of the apparatus. In apparatus wherein the pump is operated mechanically, no correction for speed is possible, without constant attention. In either case the apparatus cannot be regarded as truly automatic.

The present invention comprises at least one measuring chamber and preferably a plurality thereof. Each said chamber is provided with an overflow and with means for alternately filling and emptying the said chamber. Switches are provided for controlling the direction of flow of the liquid in a measuring chamber and these switches are respectively operated when the liquid flows from a measuring chamber during the emptying thereof, and when the liquid overflows from the chamber after the same has been filled. Hence, the direction of flow of the liquid in a chamber can be reversed, for example, when it is not being emptied and the liquid is actually overflowing from the completely filled chamber.

The invention also includes in addition to the principal arrangement just explained certain other arrangements which will be explained more fully hereafter.

It includes also certain constructional embodiments in connection with the application of the invention to measuring and distributing apparatus for combustible liquids, such as petrol, benzine and the like and to special parts or devices for use in the construction of said apparatus.

In order that the invention may be more clearly understood, it will now be described with reference to the accompanying drawings, but it is to be observed that the description and drawings are given merely by way of example.

Fig. 1 of the drawings shows diagrammatically a measuring and delivering apparatus provided with two measuring chambers, intended for liquids of a combustible nature such as petrol, benzine and the like, and constructed according to the invention; the apparatus as here shown being operated electrically.

Figs. 2, 3, 4 and 5 show also diagrammatically four electric circuits corresponding to as many phases of the operation of the said apparatus.

In the method of carrying out the invention illustrated in the drawings in which the improvements are applied to a measuring and delivering apparatus for combustible liquids, such as petrol, benzine or the like, the construction is substantially as follows.

The measuring and distributing apparatus is supposed to be provided with two measuring chambers which are ordinarily employed in apparatus of this character.

These two measuring chambers are combined with control mechanism for controlling the filling and emptying thereof, so that the direction of flow in either of said chambers is reversed twice during the period in which said chamber has been emptied and has subsequently been filled until it overflows.

The measuring chamber which is being emptied must be completely empty before it is refilled. The device must operate in this manner irrespective of the speed with which said measuring chamber is emptied or refilled. In the present device, such speed can be regulated.

When one of the chambers has been emptied and it has been filled to the point of overflow, the reversing mechanism is operated until it is in a position in which it can again reverse the direction of flow of the liquid through the chamber.

When one of the chambers has been completely filled and up to the point of overflow, the operation of the filling mechanism on said chamber is interrupted.

The parts are preferably controllable from a distance.

All the operations including the filling are carried out mechanically or electrically. The electric current is the most reliable motive power and involves the least cost for upkeep, and in what follows the whole operation of the apparatus will be described as being effected electrically.

Utilizing a monophase current, the measuring and delivering apparatus is preferably constructed as follows. There are two measuring chambers 1, of equal size and communicating preferably with a common outlet pipe 2 for emptying purposes and a common pipe 3 for the overflow. Means such as a throttle valve $2^1$ for instance, shown in Fig. 1 are provided adapted to permit the velocity of the flow of liquid to be regulated. This valve is placed in the outlet pipe 2.

4 is a reversing plug, so arranged and formed that one of the measuring chambers is emptying when the other is filling. This plug may be rotated and is arranged to turn through 90° at each movement thereof to reverse the direction of flow of the liquid in one of the chambers. As shown in Fig. 1, the plug or valve 4 is provided with two angular passages 30 and 31. In the position shown in Fig. 1, the angular passage 31 connects the outlet pipe 2 to the bottom pipe 32 located at the bottom of the left-hand chamber 1. Likewise, the angular passage 30 connects the inlet pipe $7^2$ to the bottom pipe $32^1$ of the right-hand chamber 1. In this position the left-hand chamber 1 is being emptied and the right-hand chamber 1 is being filled. However, if the valve 4 is turned in the clockwise direction through an arc of 90°, it is obvious that the passage 31 will now connect the pipe $7^2$ to the pipe 32 so that the left-hand chamber 1 will now be filled, and the passage 30 will connect the pipe $32^1$ to the outlet pipe 2 so that the right-hand chamber 1 will be emptied. Hence, the direction of flow of the liquid in the pair of chambers illustrated in this embodiment will be reversed at each actuation of the valve 4 through an arc of 90°. In the position shown in Fig. 1, the angular passage 30 connects the pipe $32^1$ to the filling pipe $7^2$ and the bottom angular passage connects the pipe 32 to the outlet pipe 2. In this position the left-hand chamber 1 is being emptied through the common outlet pipe 2 and the right-hand chamber 1 is being filled by liquid forced through the pipe $7^2$. 5 and 6 are two electric switches, respectively associated with the outlet pipe 2 and overflow pipe 3, which is connected to both chambers 1 at the tops thereof. The switch 5 is so formed and mounted that when liquid is not flowing through pipe 2 the said switch is in the circuit closing position shown in Fig. 1. On the contrary, when liquid is flowing through the pipe 2, it assumes the circuit opening position. The switch 6 is so formed and mounted that when the overflow is not in operation, it is in the circuit opening position shown in Fig. 1. On the contrary, when the overflow is operative, that is, when liquid is passing through the pipe 3, the switch 6 is moved to the circuit closing position. Each of the said switches may be constructed in various ways. For example, each switch may comprise a tube closed at the ends thereof and mounted upon the exterior of the pipe with which it is associated. Each said switch tube contains mercury into which two contact points dip when the switch is in the circuit-closing position. Only one of said points dips into the mercury when the switch is in the circuit-opening position. The respective switch pipes are respectively mounted on spindles $5^1$ and $6^1$, which can turn in bearings mounted on the respective associated tubes. The spindles $5^1$ and $6^1$ are respectively provided with vanes $5^2$ and $6^2$ which project into the interiors of the respective associated tubes, so that they normally occupy positions perpendicular to the axis of the adjacent inclined portions of said tubes. When either of said vanes is deflected by the movement of liquid in the associated tube, it turns in the adjacent enlargement of the tube, and causes the corresponding member 5 or 6 to turn into the circuit-opening or circuit-closing position, dependent upon the original position of the switch member 5 or 6, which has been previously specified. Each of said switch members 5 and 6 is counterbalanced so that it normally assumes the position indicated in Fig. 1, in which the corresponding vane $5^2$ or $6^2$ is perpendicular to the axis of the inclined portion of the associated tube. The spindle $5^1$ may be advantageously provided with a float (not shown) so that if the outward flow of liquid from the bottom of a chamber is interrupted for any reason, the switch member 5 will remain in the position shown in Fig. 1.

A filling pump 7 is provided for alternately filling the chambers 1 in the manner before specified. This pump may for example be a double acting piston pump, with a suction pipe $7^1$, a delivery pipe $7^2$, and means for operating the pump or enabling it to operate even when a solid portion of the reversing plug abuts the end of the delivery pipe $7^2$. For this purpose a branch or return pipe $7^3$ may be provided which is connected to the delivery pipe $7^2$ and is also connected to the reservoir for the liquid.

A one-way valve may be provided in the pipe $7^3$ so that the liquid can return downward to the reservoir when sufficient pressure is exerted on the liquid in the branch pipe $7^3$, that is, when the end of the inlet or delivery pipe $7^2$ abuts a solid portion of the reversing plug 4. This occurs for the short period during which the reversing plug 4 is turned through an arc of 90°. This valve in pipe $7^3$ will not allow liquid to pass upwardly through said pipe.

8 is an electric motor which may be placed in any position in connection with the supply device. The plug may be operated from a special electric motor started or stopped by a current controlling the reversal.

Transmission gearing is provided so that the electric motor can operate the feed pump 7. To accomplish this, the shaft of the said motor may, for example, comprise a portion $8^1$ formed as a worm engaging a work wheel 9 mounted on a shaft $9^1$. This last mentioned shaft may carry a disc $9^2$ provided with a pin $9^3$ to which one end of a connecting rod $7^4$ is pivoted, the other end of the rod $7^4$ being pivoted to the piston rod of the said pump.

Transmission means are also provided as to enable the electric motor to operate the reversing plug at certain times. For example two shafts 10 and 11 may be provided, in axial alignment, between which an electrical clutch of any type is interposed, for instance the electromagnetic clutch shown in Fig. 1. This clutch comprises two discs $10^1$ and $11^1$ opposite to one another and very close to each other when they are separated, as shown in Fig. 1. One of these, the disc $11^1$, for instance, is provided with a lug or feather, slidable in a vertical groove in shaft 11. The other disc $10^1$ is provided with an electromagmatic coil $10^2$ suitably formed. Assuming as suggested above, that the plug at each reversal has to turn through an arc of 90°, four equally spaced fingers or cams $10^3$ are provided at the periphery of the disc $10^1$. Since the shaft 10 is fixed at one end to the centre of the disc $10^1$ and is connected at the other end to the plug through the bevel gear $10^6$, the shaft 10 and the reversing plug 4 are properly connected so that the plug turns in unison with the disc $10^1$. One end of shaft 11 is connected to the centre of disc $11^1$. The other end of shaft 11 has a bevel-gear which meshes with a bevel-gear $9^4$ mounted on the shaft $9^1$.

A disc 12 is mounted on a transverse shaft. Said disc 12 is connected with shaft 10, so that when shaft 10 is turned, an index provided on disc 12 is moved one division on the fixed scale 13, for each reversal of the filling mechanism. The disc 12 is provided with a projecting portion $12^1$.

The controlling and operating circuit includes a step-down transformer 14 which is adapted to step-down a high tension alternating current. The primary coil of the transformer may be connected to the power line through the leads 15, $15^1$ by means of the main switch $15^2$. 17 is a relay switch inserted in the high tension circuit 16, $16^1$ leading to the motor; 18 is a two direction switch adapted to cause the current to pass to the contact $18^1$. This swich 18 is operated by the cam $12^1$ of the disc 12, as will be later more fully described. 19 is a hand switch. 20, 21 and 22 are brushes adapted to conduct the current to the coil $10^2$ by means of the rings $10^4$ and $10^5$ to which the ends of the coils $10^2$ are connected. The brushes 20 and 21 bear constantly respectively against the said rings, and the brush 22 is so arranged that sometimes it is in contact with the ring $10^4$, whilst at other times it is removed from the said ring against the stress of a spring by one of the fingers or cams $10^3$ carried on the periphery of the magnetic disc.

The whole arrangement of the connections and parts is such that supposing the switch 19 to be closed, the circuits shown on the drawings in full lines at Figs. 2, 3, 4 and 5 are successively brought into operation during the working of the apparatus.

The stages of operation of the apparatus thus constructed starting from the position of rest of the parts shown at Fig. 1 and after the current has been connected to the devices are as follows.

Figure 2:
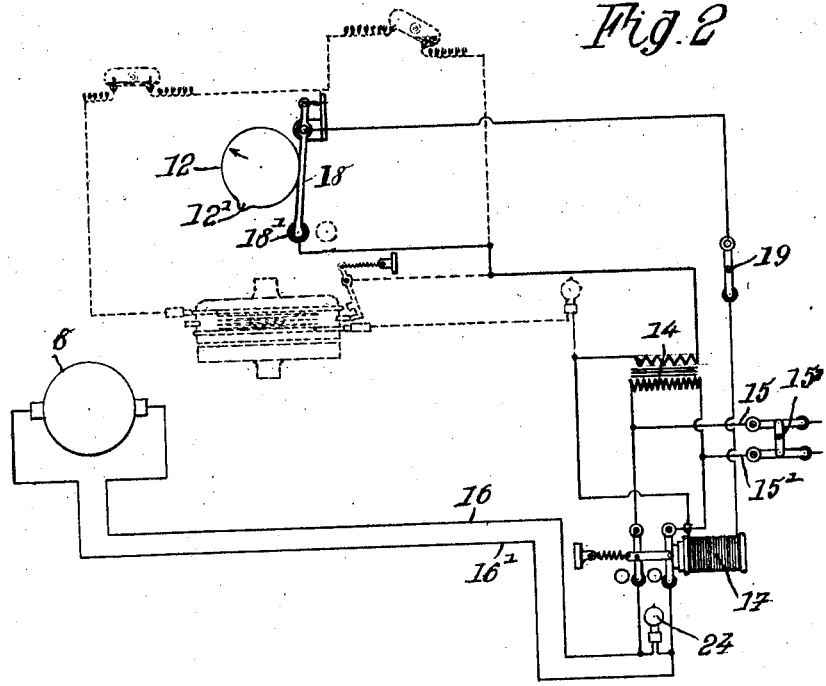

Before starting up the apparatus the disc 12 is turned by hand from the "zero" position indicated in Fig. 1 so as to bring the pointer carried thereby opposite the desired number on the scale 13. This causes the cam $12^1$ to move away from member 18 so that the member 18 moves into contact with $18^1$ since it is urged into this position by the associated tension spring shown in Fig. 1. The switch 19 is then closed and since the primary current in the line is an alternating current this induces a secondary alternating current of lower voltage through the secondary coil of the transformer 14. The closed circuit is shown in Fig. 2. When the member 18 touches the contact $18^1$, the two ends of the electromagnetic coil which is part of the relay switch 17, are connected to the ends of the secondary coil of the transformer 14. This causes the closing of the relay switch so that current is supplied to the motor 8, which begins to turn. The alternating secondary current can operate the electromagnet 17, since electromagnets actuated by alternating currents are well known, and if desired, a suitable rectifier could be associated with each magnet to be actuated by the alternating current.

When the motor 8 begins to turn, this causes the actuation of the shaft 11 and the disc $11^1$. The pump 7 is now continuously actuated to fill one of the receptacles 1, as, for example, the right-hand receptacle 1 shown in Fig. 1. The filling of the said chamber 1 should be continued until the overflow point has been reached, that is, until the liquid begins to flow out through the pipe 3. The direction of flow of the liquid should then be reversed, that is, it should flow out of the right-hand chamber 1 and be pumped into the left-hand chamber 1. During this filling operation, the disc $10^1$ remains stationary because it remains disconnected from the disc $11^1$, since coil $10^2$ is not energized.

Figure 3:
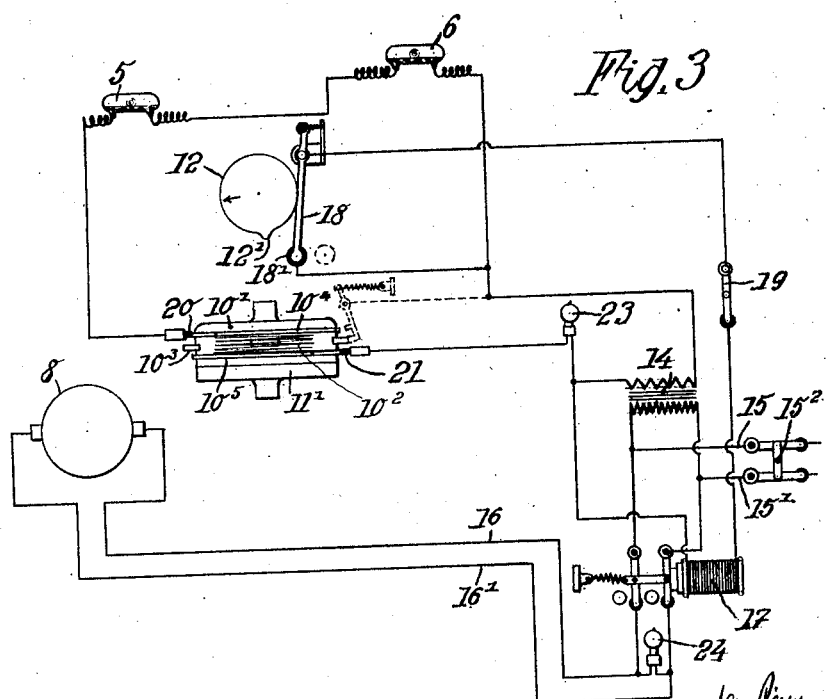

As soon as the right-hand chamber 1 has been filled and the overflow begins, the vane $6^2$ is operated by the movement of the liquid in the overflow pipe 3, so that the switch 6 is moved from the circuit-opening position to the circuit-closing position. Since the switch 5 is normally in the circuit-closing position, both said switches are now in the closed position, and the circuit shown in Fig. 3 is formed. The ends of the secondary coil of the transformer 14 are now connected to the brushes 20 and 21 through the switches 5 and 6, so that the coil $10^2$ is energized and the discs $10^1$ and $11^1$ are magnetically coupled, whereby the shaft 10 is actuated to cause the turning of the plug 4. As soon as the plug 4 begins to turn, this prevents additional liquid from being pumped into the chamber or receptacle 1 which has been filled, so that the overflow in the pipe 3 ceases and the switch $6^1$ assumes the normally open position shown in Fig. 1. However, the current through the coil $10^2$ which causes the discs $10^1$ and $11^1$ to be magnetically coupled as before mentioned, is not interrupted because one of the cams $10^3$, which was in contact with the brush 22 as shown in Fig. 3, is removed from contact with the said brush 22. Hence, the brush 22 is free to move into the position shown in Fig. 4, in which it contacts with the ring $10^4$ so as to directly couple one end of the secondary coil of the transformer 14 to the ring $10^4$, independently of the switches 5 and 6. Of course, the switch 5 is moved into the open position shown in Fig. 4 as soon as the plug 4 has been turned 90°, so that the liquid flows out through the pipe 2. As soon as the plug 4 has been turned 90°, the next cam $10^3$ moves the brush 22 from contact with the ring $10^4$, thus releasing the magnetic coupling between the discs $10^1$ and $11^1$, and the valve 4 becomes stationary. The position of the parts is the same as that shown in Fig. 2. The pointer of the disc 12 is moved one degree or space on the scale 13 at each 90° actuation of the plug 4.

The pump is thus continuously operated to alternately fill the chambers 1 so that one of them must be completely filled before the reversal can take place until the cam $12^1$ again contacts with the lever 18 and moves it away from the contact $18^1$. At the same time, one of the four cams $10^3$ moves the brush 22 away from the ring $10^4$. The entire circuit of the apparatus and all branches of said circuit therefore remain broken, as shown in Fig. 5. The operation of the motor is then stopped, which shows that the desired quantity of liquid has been dispensed.

Upon opening the hand switch 19, the disc 12 can be adjusted to correspond to the amount of liquid which is to be dispensed, while the motor remains stationary. When the switch 19 is opened, the entire apparatus is again in the normal position shown in Fig. 1. Hence, the entire apparatus is automatically caused to operate by merely opening and closing the hand switch 19 and setting the indicating disc 12. The telltale lamp 23, which is connected in series at any suitable point, flashes at each actuation of the plug 4 so that the operation of the device can be suitably checked up. A second lamp 24 is placed into the circuit between the motor and the relay switch 17 and its light shows that the motor is working.

Since the switch 6 cannot be operated to change the circuit shown in Fig. 2 to that shown in Fig. 3, until the right-hand chamber 1 has been filled and overflows, the first movement of switch 6 to the circuit-closing position shown in Fig. 3, is independent of the rate at which the pump 7 operates. Hence, the valve 4 is not given its first intermittent movement until the right-hand chamber 1 is filled and overflows. For convenience, the flow of liquid from the bottom of a chamber, to empty the same, may be designated as the "normal" flow or outflow of said liquid.

The switch 6 assumes the circuit-opening position before the valve 4 has completed its first intermittent movement to connect the second chamber 1 to the pump. Since the flow of liquid out of the first (or right-hand) chamber 1, through pipe 2 moves the switch 5 to the circuit-opening position, the valve 4 cannot be given its second intermittent movement until the first chamber 1 has been completely emptied. Hence, liquid cannot be forced into a chamber which has been previously filled, until said chamber has been completely emptied and the other chamber has been filled to the overflow point. The operation of the control is thus not only independent of the rate of operation of the pump, but of the rate of emptying of the respective chambers.

The switch member 6 forms a control means for the valve-actuating mechanism operable by the overflow from one of said chambers, and the switch member 5 forms a second control means for said valve mechanism operable by what may be termed the normal outflow of another chamber during the emptying thereof.

As has already been stated the invention is not limited to the particular construction described and illustrated, but includes all modifications falling within a fair interpretation of the claims.

What I claim and desire to secure by Letters Patent in the United States of America is:—

1. A dispensing device for liquids comprising a pair of chambers, each of which has an overflow outlet, a pump adapted to force liquid into either of said chambers, connections intermediate said pump and said chambers comprising movable valve means adapted to connect said pump to either of said chambers, said valve means being also adapted to control the normal outflow of liquid from said chambers, mechanism adapted to actuate said valve means to cause said pump to be connected to one of said chambers and to permit the normal outflow of liquid from a filled chamber which has been filled up to the height of the overflow outlet thereof, first control means for said mechanism operable by the overflow of liquid from one of said chambers, second control means for said mechanism operable by the normal outflow of liquid from another chamber during the emptying thereof, the said mechanism remaining inoperative save when the first control means is operated and the second control means remains unoperated.

2. A dispensing device for liquids comprising a pair of chambers each of which has an overflow outlet connected to a common overflow pipe, a pump adapted to force liquid into either of said chambers, each said chamber having an outflow outlet, a revoluble valve adapted to connect said pump to the outflow outlet of either of said chambers, said valve being also adapted to connect either of said outflow outlets to a common outlet pipe, mechanism adapted to actuate said valve means to cause one of said chambers to be connected to said pump while the other chamber is connected to said common outlet pipe, first control means for said mechanism associated with said overflow pipe and operable by the flow of liquid therein, second control means for said mechanism associated with said outlet pipe and operable by the flow of liquid therein, said mechanism remaining inoperative save when the first control means is operated and the second control means remains unoperated.

3. A dispensing device for liquids comprising a pair of chambers, each of which has an overflow outlet, a pump adapted to force liquids into either of said chambers, connections intermediate said pump and said chambers comprising movable valve means adapted to connect said pump to either of said chambers, said valve means being also adapted to control the normal outflow of liquid from said chambers, mechanism including electromagnetic means and being adapted to actuate said valve means to cause said pump to be connected to one of said chambers and to permit the normal outflow of liquid from a filled chamber which has been filled up to the height of the overflow outlet thereof, a source of electric current adapted to be connected to said electromagnetic means, a first switch controlling the supply of current to said electromagnetic means and operable by the overflow of liquid from one of said chambers, a second switch controlling the supply of current to said electromagentic means and operable by the normal outflow of liquid from another chamber during the emptying thereof, the said switches being adapted to discontinue the supply of current to said electromagnetic means save when the first switch is operated and the second switch remains unoperated.

4. A dispensing device for liquids comprising a pair of chambers each of which has an overflow outlet, a pump adapted to force liquid into either of said chambers, connections intermediate said pump and said chambers comprising movable valve means adapted to connect said pump to either of said chambers, said valve means being also adapted to control the normal outflow of liquid from said chambers, mechanism including an electromagnetic coupling having a coil, said mechanism being adapted to actuate said valve means to cause said pump to be connected to one of said chambers and to permit the normal outflow of liquid from a filled chamber which has been filled up to the height of the overflow outlet thereof, a source of electric current adapted to be connected to said coil, a first switch controlling the supply of current to said coil and operable by the overflow of liquid from one of said chambers to actuate said switch from a circuit-opening position to a circuit-closing position, a second switch controlling the supply of current to said coil and operable by the normal outflow of liquid from another chamber during the emptying thereof from a circuit-closing position to a circuit-opening position, whereby current is supplied to the said coil only when the first switch is operated and the second switch remains unoperated.

5. A dispensing device for liquids comprising a pair of chambers, each of which has an overflow outlet, a pump adapted to force liquid into either of said chambers, connections intermediate said pump and said chambers comprising movable valve means adapted to connect said pump to either of said chambers, said valve means being also adapted to control the normal outflow of liquid from said chambers, mechanism adapted to actuate said valve means to cause said pump to be connected to one of said chambers and to permit the normal outflow of liquid from a filled chamber, first control means for said mechanism operable by the overflow of liquid from one of said chambers, second control means for said mechanism operable by the normal outflow of liquid from another chamber during the emptying thereof, the said mechanism remaining inoperative save when the first control means is operated and the second control means remains unoperated, and third control means operable in unison with said valve means and adapted to intermittently render said mechanism operative for predetermined periods.

6. A dispensing device for liquids comprising a pair of chambers, each of which has an overflow outlet, a pump adapted to force liquid into either of said chambers, connections intermediate said pump and said chambers comprising movable valve means adapted to connect said pump to either of said chambers, said valve means being also adapted to control the normal outflow of liquid from said chambers, mechanism including electromagnetic means and being adapted to actuate said valve means to cause said pump to be connected to one of said chambers and to permit the normal outflow of liquid from a filled chamber which has been filled up to the height of the overflow outlet thereof, a source of electric current adapted to be connected to said electromagnetic means, a first switch controlling the supply of current to said electromagnetic means and operable by the overflow of liquid from one of said chambers, a second switch controlling the supply of current to said electromagnetic means and operable by the normal outflow of liquid from another chamber during the emptying thereof, the said switches being adapted to discontinue the supply of current to said electromagnetic means save when the first switch is operated and the second switch remains unoperated, and a third switch operable in unison with the movement of said valve means and adapted to intermittently cause said current to be supplied to the said electromagnetic means for predetermined periods.

7. A dispensing device for liquids comprising a pair of chambers each of which has an overflow outlet connected to a common overflow pipe, each of said chambers having an outflow pipe at the bottom thereof, a pump having a pipe adapted to be connected to either of the outlet pipes of the said chambers, a common outlet pipe adapted to be connected to either of the outlet pipes of the said chambers, a revoluble valve having a plurality of passages adapted to simultaneously connect the pump pipe to the outlet pipe of one of said chambers and to connect the common outlet pipe to the outlet pipe of another of said chambers, a revoluble disc connected to said valve and movable in unison therewith, a motor having a second disc connected thereto, a coil adapted to electromagnetically couple the said discs when the said coil is energized, a source of current adapted to be connected to said coil to energize the same, a switch associated with the common outlet pipe and operable by the flow of liquid therethrough from a normal circuit-closing position to a circuit-opening position, a second switch associated with the common overflow pipe and operable by the flow of liquid therethrough from a circuit-opening position to a circuit-closing position, a third switch associated with a spring adapted to normally urge the said switch to a circuit-closing position, and spaced cam members connected to the first-mentioned revoluble disc and adapted to urge the third switch to a circuit-opening position.

8. A dispensing device for liquids comprising a pair of chambers, each of which has an overflow outlet, a pump adapted to force liquid into either of said chambers, connections intermediate said pump and said chambers comprising movable valve means adapted to connect said pump to either of said chambers, said valve means being also adapted to control the normal outflow of liquid from said chambers, mechanism adapted to actuate said valve means to cause said pump to be connected to one of said chambers and to permit the normal outflow of liquid from a filled chamber which has been filled up to the height of the overflow outlet thereof, first control means for said mechanism operable by the overflow of liquid from one of said chambers, second control means for said mechanism operable by the normal outflow of liquid from another chamber during the emptying thereof, the said mechanism remaining inoperative save when the first control means is operated and the second control means remains unoperated, and third control means including a cam operable in unison with the movement of the said valve means and adapted to render the said mechanism inoperative after a predetermined number of movements of the said valve means.

9. A dispensing device for liquids comprising a pair of chambers, each of which has an overflow outlet, a pump adapted to force liquid into either of said chambers, connections intermediate said pump and said chambers comprising movable valve means adapted to connect said pump to either of said chambers, said valve means being also adapted to control the normal outflow of liquid from said chambers, mechanism including a clutch and being adapted to actuate said valve means to cause said pump to be connected to one of said chambers and to permit the normal outflow of liquid from a filled chamber which has been filled up to the height of the overflow outlet thereof, said clutch comprising a driving member and a driven member, said driven member being connected to and movable in unison with said valve means, first control means for said mechanism operable by the overflow of liquid from one of said chambers, second control means for said mechanism operable by the normal outflow of liquid from another chamber during the emptying thereof, and third control means for said mechanism connected to said driven member of the clutch and movable in unison therewith, said third control means being adapted to cause the continued operation of said actuating mechanism until said driven member has been turned through a predetermined angle.

10. A device according to claim 7 and having an additional cam member connected to said revoluble disc and movable in unison therewith, and a fourth switch operable by said cam member to open the circuit when said cam member is in a predetermined position.

In testimony whereof I hereunto affixed my signature.

JEAN PIERRE COURTIOUX.